United States Patent [19]
Farrell

[11] Patent Number: 5,467,744
[45] Date of Patent: * Nov. 21, 1995

[54] OSCILLATING PISTON ENGINE FOR HELICOPTERS

[76] Inventor: Monti Farrell, 1942 Carpenter Canyon Rd., San Luis Obispo, Calif. 93401

[ * ] Notice: The portion of the term of this patent subsequent to Jun. 29, 2010, has been disclaimed.

[21] Appl. No.: 72,240

[22] Filed: Jun. 4, 1993

Related U.S. Application Data

[63] Continuation-in-part of Ser. No. 918,374, Jul. 23, 1992, Pat. No. 5,222,463.
[51] Int. Cl.⁶ .............................. F02B 53/00; B64C 27/04
[52] U.S. Cl. ..................................... 123/18 A; 244/17.11
[58] Field of Search ................................ 123/18 R, 18 A; 244/17.11; 416/147

[56] References Cited

U.S. PATENT DOCUMENTS

| | | | |
|---|---|---|---|
| 1,012,201 | 12/1911 | Harper | 123/44 R |
| 2,514,206 | 7/1950 | Perry | 244/17.11 |
| 3,635,426 | 1/1972 | Stanley | 244/17.11 |
| 5,062,824 | 11/1991 | Prokopius | 475/342 |
| 5,222,463 | 6/1993 | Farrell | 123/18 A |
| 5,303,546 | 4/1994 | Farrell | 123/18 A |

Primary Examiner—Michael Koczo
Attorney, Agent, or Firm—Coudert Brothers

[57] ABSTRACT

The system including an internal combustion engine provides the motive power source to the main and tail rotor systems of a helicopter. The engine has a rotating annular cylinder which is rotated in a predetermined ratio to oscillation of a plurality of pairs of oscillating pistons in the cylinder, the pistons being so oscillated so that adjacent pistons are moved alternately apart from one another and toward one another for the respective strokes of the internal combustion engine and having intake port, exhaust ports and ignition means on the rotating annular cylinder located by the rotation of the cylinder between adjacent pistons according to the firing order and cycle of the engine in a typical four stroke cycle system. The engine includes the use of unitary in place of articulated, oscillating crank arms to transmit power from the torque tubes to the crankshaft, and the use of pistons having gabled surfaces that are rigidly connected to the torque discs. The system also includes transmission means means for reducing the torque speed of said crankshaft and for rotating the main rotor head and blades and tail rotor systems of the helicopter.

20 Claims, 7 Drawing Sheets

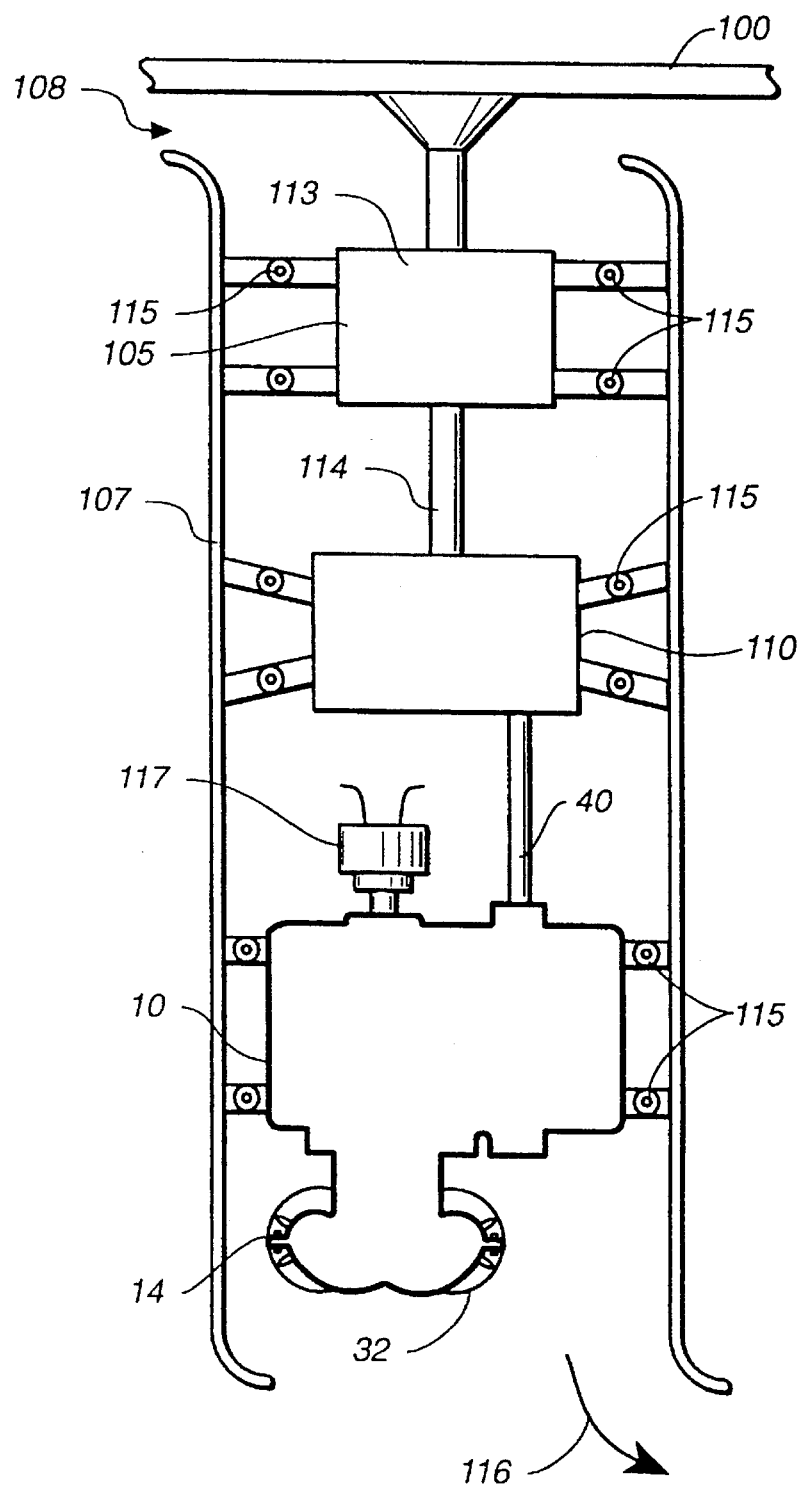
FIG._10

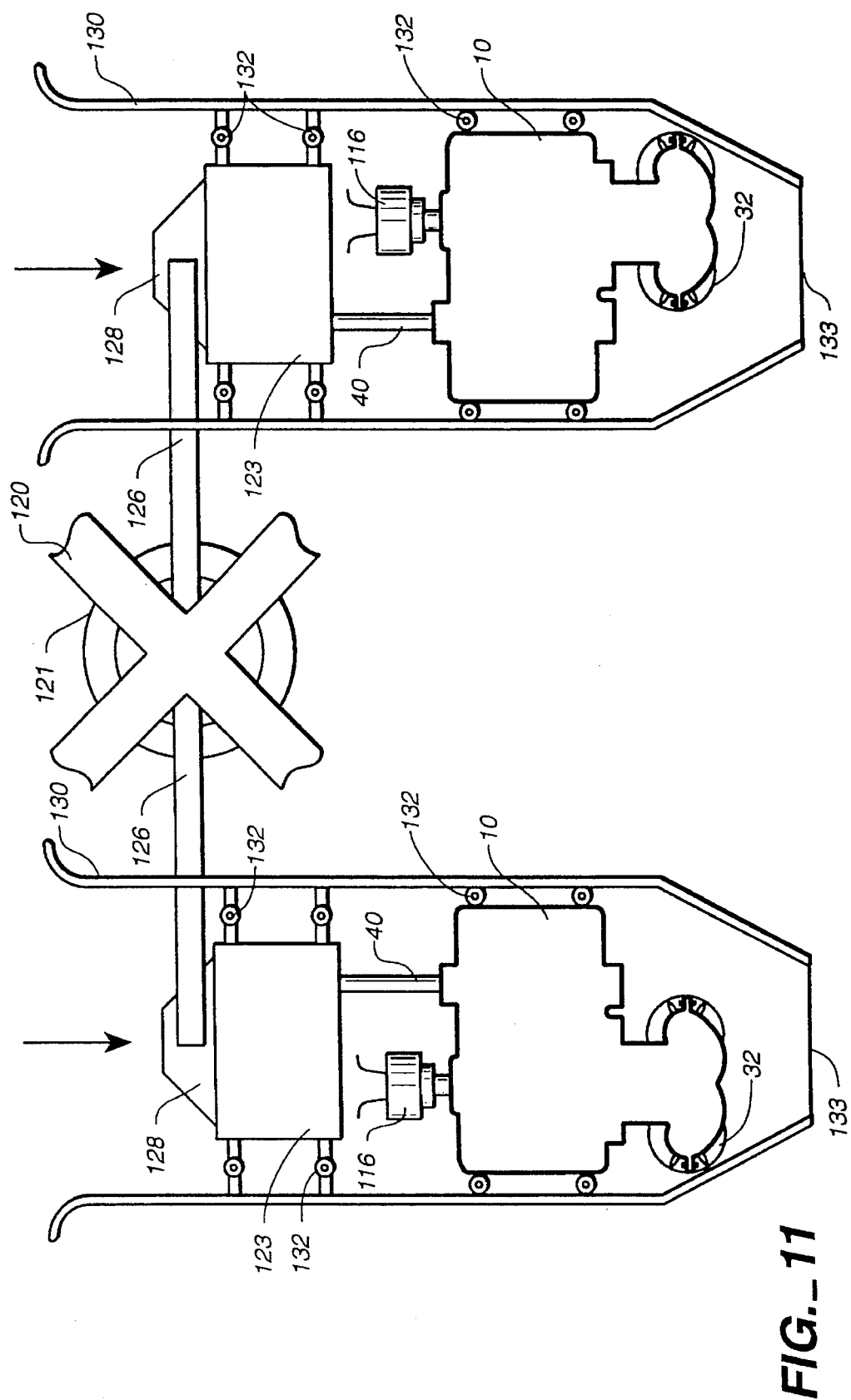
FIG._11

OSCILLATING PISTON ENGINE FOR HELICOPTERS

This application is a continuation-in-part of application U.S. Ser. No. 918,374, filed Jul. 23, 1992, now U.S. Pat. No. 5,222,463.

FIELD OF THE INVENTION

This invention relates generally to the field of internal combustion engines. Specifically, this invention relates to certain improvements in a type of internal combustion engine that has a plurality of oscillating pairs of pistons contained within a rotating annular cylinder to provide the motive power source of rotor systems of a helicopter.

BACKGROUND OF THE INVENTION

The oscillating piston/rotating cylinder engine has been described in P. E. Morgan, U.S. Pat. No. 3,516,392. In this type of engine, an annular cylinder is rotated in a predetermined ratio to the oscillations of a plurality of pairs of oscillating pistons contained within the cylinder. The pistons are oscillated so that adjacent pistons in each pair are moved alternately toward and away from each other for the respective strokes of a four-stroke cycle internal combustion engine. Intake ports, exhaust ports, and ignition means in the rotating cylinder are located by the rotation of the cylinder with respect to the pistons in accordance with the firing order and cycle of the engine. While the Morgan engine is capable of favorable efficiencies as compared with those of conventional reciprocating piston engines, increasingly rigid standards of fuel economy and emissions control have made further improvements in mechanical and thermal efficiency highly desirable. In this regard, for example, the Morgan engine has a relatively large number of moving parts that add weight and complexity, and create friction losses, while the design of the pistons (essentially disc-shaped, with flat sides) does not optimize the extraction of useful energy from combustion during the power stroke.

It would be highly desirable, therefore, to improve the Morgan engine, whereby the advantages of the basic oscillating piston/rotating cylinder design are retained, while increasing efficiency by reducing the number of moving pars and optimizing piston design.

SUMMARY OF THE INVENTION

The improvements herein are primarily the application of an improved oscillating piston engine to provide the motive power source to drive the transmission, main rotor blades, and the anti-torque tail rotor systems of a conventional helicopter.

Present day helicopters are powered by conventional reciprocating piston aircraft engines or airworthy turbine power engines. The system of this invention replaces these engine power systems with the improved oscillating piston engine as an alternative, fuel efficient motive power force for present day helicopters.

As an example, a five inch bore cylinder version of the improved oscillating piston engine will produce five hundred output shaft horsepower, at a fly away engine system weight of two hundred-thirty pounds. This weight improvement will permit increased payload weight and more efficient airborne operations utilizing existing helicopter air frame designs.

Broadly, the present invention uses an oscillating piston/rotary cylinder internal combustion engine, of the type described in U.S. Pat. No. 3,516,392 (the disclosure of which is incorporated herein by reference), wherein the improvements include: (a) the use of unitary (rather than articulated), oscillating crank arms, of the "Scotch yoke" type, to transmit power from the torque tubes to the crankshaft; (b) the use of pistons, having gabled surfaces, that are rigidly connected by means of torque discs to torque tubes that transmit power from the pistons to the crankshaft via the crank arms; (c) a magnetic, Hall effect ignition system (instead of a gear-and-shaft driven point/contact distributor); and (d) a plurality of relatively small balancing discs integral with the crankshaft, at least one of which is journalled in an annular ball bearing race. These improvements may be more specifically described as follows:

Each of the "Scotch yoke" crank arms comprises an elongated arm member having a circular aperture near one end, through which one of the torque tubes passes. The torque tube is fixed to the arm within the aperture. An elliptical aperture near the other end of the arm receives a ball bearing follower that is concentrically carried on a crank throw of the engine's crankshaft. By this arrangement, the rotational or axial oscillation of the torque tube is first translated into a back-and-forth oscillation of the crankshaft end of the arm, and then translated into a rotation of the crankshaft. The Scotch yoke crank arms thus replace the crank arm, connecting rod, and crank pin of the prior art Morgan engine with an assembly that provides a more direct connection, with lower frictional losses, between the crankshaft and the torque tube, thereby more efficiently transmitting power from the pistons to the crankshaft via the torque tubes.

Each of the pistons of the engine constructed in accordance with the present invention is configured with a pair of oppositely-directed, gabled faces. The pistons in each mutually-oscillating pair of pistons thus have opposed gabled surfaces facing each other to form a substantially conical chamber when they approach each other during the compression stroke. This conical combustion chamber provides increased combustion efficiency, while allowing the compression ratio to be selected by appropriately selecting the slope of the piston surface. This combustion chamber configuration also eliminates, or at least minimizes, the pressure spike associated with combustion in the flat-sided combustion chamber formed by the disc-shaped pistons in the Morgan engine. Moreover, compression damping at the end of combustion is progressive in the present invention, as opposed to linear in the Morgan engine, because of the gabled piston faces.

While the pistons of the Morgan engine are loosely mounted by pins onto arms extending from a center holder that is fastened to a torque tube, each of the pistons in the present engine is attached to one of a pair of torque discs, each of which, in turn, is welded (or similarly fixed) to one of the torque tubes. As compared with the piston arrangement of the Morgan engine, the present arrangement provides better balance, reduced vibration, lower frictional losses, and more efficient transfer of power to the torque tubes.

In the Morgan engine, ignition is accomplished by means of a conventional spark ignition system, using a timing mechanism (presumably a distributor) that is operated by a shaft driven by the crankshaft through a gear train. Electric current is provided to the spark plugs through conductor rings on an exhaust pipe that rotates with the cylinder. The rings make contact with stationary brushes that are connected to a voltage source (i.e., a generator or alternator) through the timing mechanism.

In the present invention, the spark plugs are fired by ignition modules mounted on the rotating cylinder. The ignition modules contain circuitry that is triggered to generate a spark inducing voltage in response to magnetic pulses received, via magnetic pick-ups that rotate with the cylinder, from a plurality of magnets located at appropriate intervals around an annular holder mounted on the crankcase. The current that creates the spark is delivered to the ignition modules by a brush and slip ring arrangement. This new ignition system provides for more precise spark timing, while adjustment of spark advance can be effected by rotating the magnet holder with respect to the crankcase. Moreover, the gear-and-shaft mechanism for driving the ignition timing mechanism is eliminated, along with its frictional losses, thereby increasing engine efficiency.

The Morgan engine uses a single, relatively massive flywheel at the distal end of the crankshaft. The present invention replaces this single flywheel with three smaller flywheels, or balancing discs, located at spaced intervals along the crankshaft, with the center balancing disc (at least) being journalled within an annular ball bearing race to accept torque arm loads. The result is improved smoothness of operation, better support for the crankshaft, and less crankshaft vibration, as compared with the Morgan engine.

The above summary provides an overview of the major advantages of the present invention over the prior art Morgan engine. These and other advantages will be more fully developed in the detailed description that follows.

BRIEF DESCRIPTION OF THE DRAWINGS

FIG. 10 is a diagrammatic view illustrating of the combination of the improved oscillating piston engine of the present invention and a transmission driving a helicopter rotor blade using a vertical power train; and FIG. 11 is a diagrammatic view illustrating the combination of the improved oscillating piston engine and transmission driving a helicopter blade using dual horizontal power trains as shown from above the helicopter.

DETAILED DESCRIPTION OF THE PREFERRED EMBODIMENT

Figure 1:
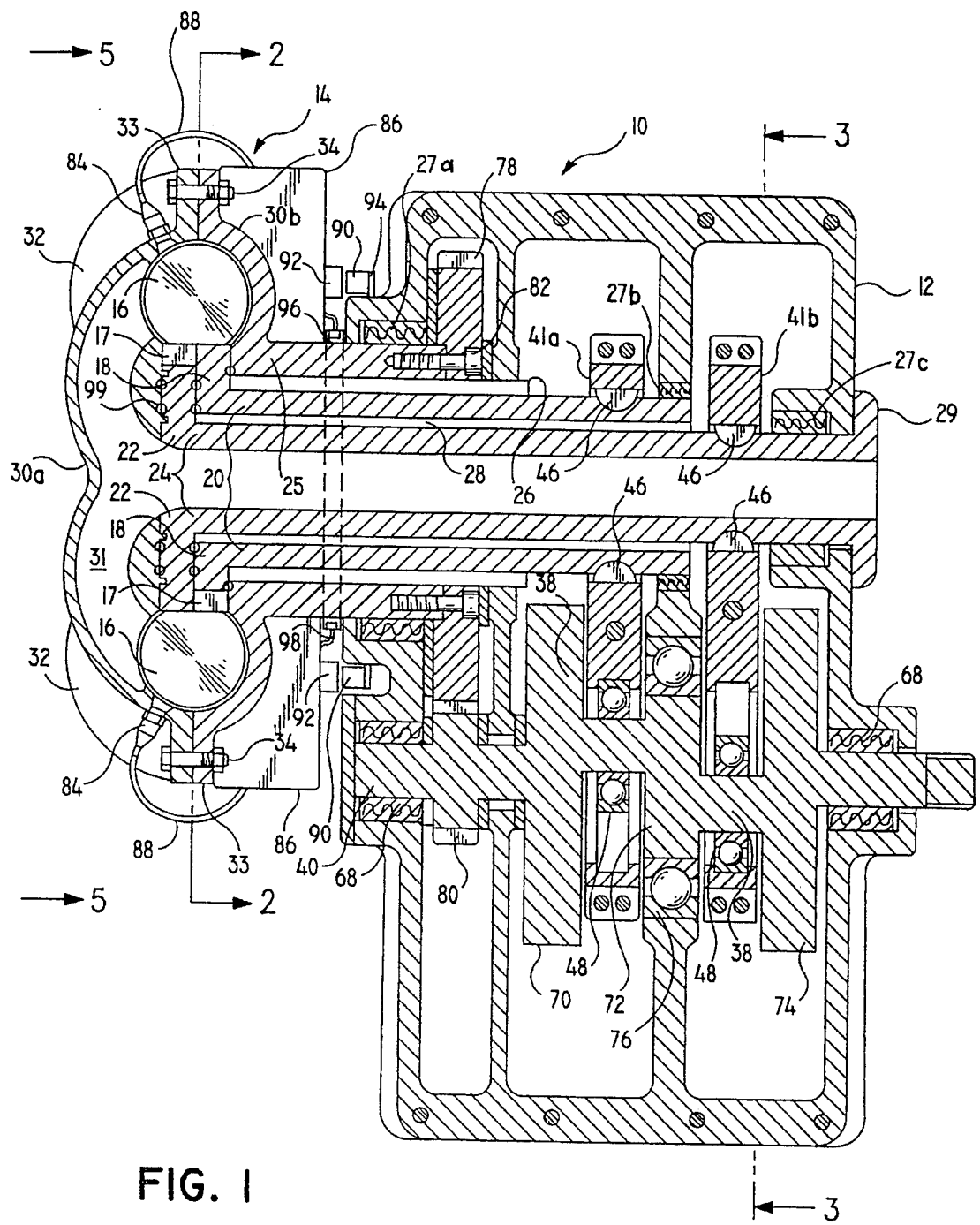
FIG. 1 is a longitudinal cross-sectional view of an improved oscillating piston engine, in accordance with a preferred embodiment of the present invention.

Referring now to the drawings, FIG. 1 shows an oscillating piston/rotating cylinder engine 10, in accordance with a preferred embodiment of the present invention. This disclosure will focus primarily on the novel aspects of the present invention. For a description of the general structure and principles of operation of an oscillating piston/rotating cylinder engine, the reader is referred to U.S. Pat. No. 3,516,392, the disclosure of which is incorporated herein by reference, as previously mentioned.

The engine 10 includes a crankcase 12, in which a rotatable, generally annular cylinder 14 is mounted. The cylinder 14 contains a plurality of mutually-oscillating pairs of pistons 16. In the preferred embodiment, there are four such pairs of pistons, at 90° intervals around the cylinder.

In each pair of pistons, one piston is rigidly fixed to it respective annular torque disk by means of a mounting stub. As shown in FIG. 1, the first piston in the pair is attached by means of mounting stub 17 in a corresponding notch to first annular torque disk 18 that defines the proximal end of a first, or outer, torque tube 20. The other piston in the pair is attached by means of mounting stub 17 in a notch to a second annular torque disk 22 that defines the proximal end of a second, or inner, torque tube 24, disposed concentrically within the outer torque tube 20. The pistons are preferably secured to their respective flanges by welding, but attachment means such as roll pins may be used. The torque tubes 20 and 24 are generally concentric with the cylinder 14. The cylinder 14 includes a tubular hub 25 that is rotatably supported, in the crankcase 12, between a first tubular sleeve bearing 26, preferably a sleeve made of polytetrafluoroethylene (PTFE), sold under the registered trademark TEFLON, and a first plurality of roller bearings 27a. The torque tubes 20 and 24 extend axially through the first sleeve bearing 26. A second tubular sleeve bearing 28 (also preferably made of PTFE) is disposed between the two torque tubes. The distal end of the outer torque tube is rotatably journalled between the second sleeve bearing 28 and a second plurality of roller bearings 27b. The inner torque tube 24 is rotatably supported, near its distal end, by a third plurality of roller bearings 27c. The distal end of the inner torque tube 24 is provided with a peripheral flange 29 for axial retention. An anti-friction washer (not shown) may advantageously be provided between the flange 29 and the crankcase 12.

Thus, the hub 25 and the torque tubes 20 and 24 are concentrically aligned along a common axis of rotation, and are independently rotatable with respect to one another, by virtue of the sleeve bearings 26 and 28 and the roller bearings 27a, 27b and 27c.

The annular cylinder 14 is formed from a pair of circumferentially-divided cylinder segments, an outer segment 30a forming the intake manifold, and an inner segment 30b, that fit together to define a generally annular cylinder chamber 31 within the cylinder 14. Both cylinder segments 30a and 30b are provided with a plurality of radial cooling fins 32 at spaced intervals on its exterior surface. Each of the cylinder segments 30a and 30b has an exterior flange 33, and the flanges 33 are removably secured to each other by suitable means, such as bolts 34. The cylinder hub 25 extends axially from the inner segment 30b.

Figure 2:
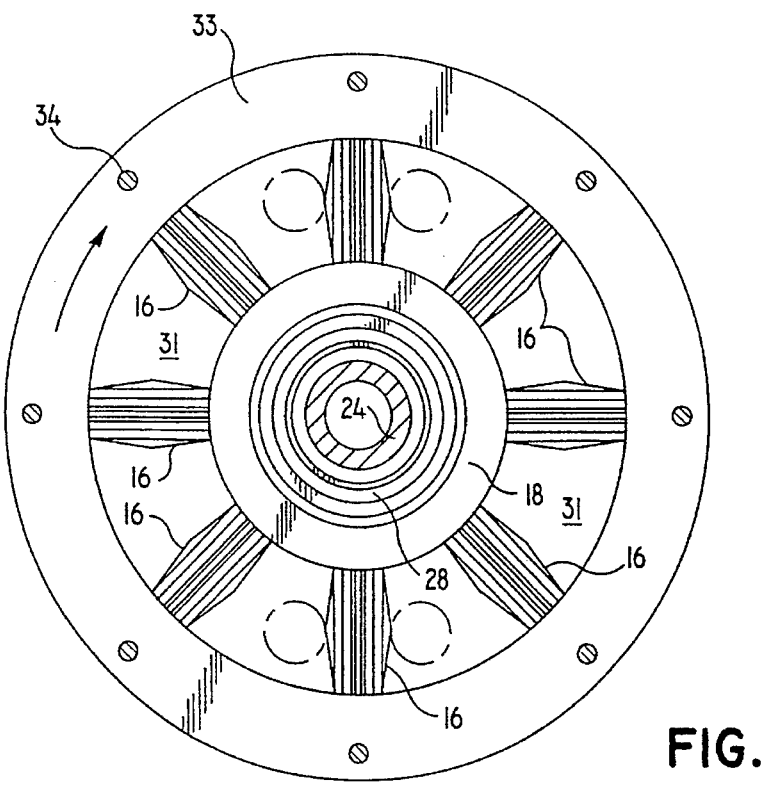
FIG. 2 is a cross-sectional view of the engine, taken along line 2—2 of FIG. 1.
Figure 5:
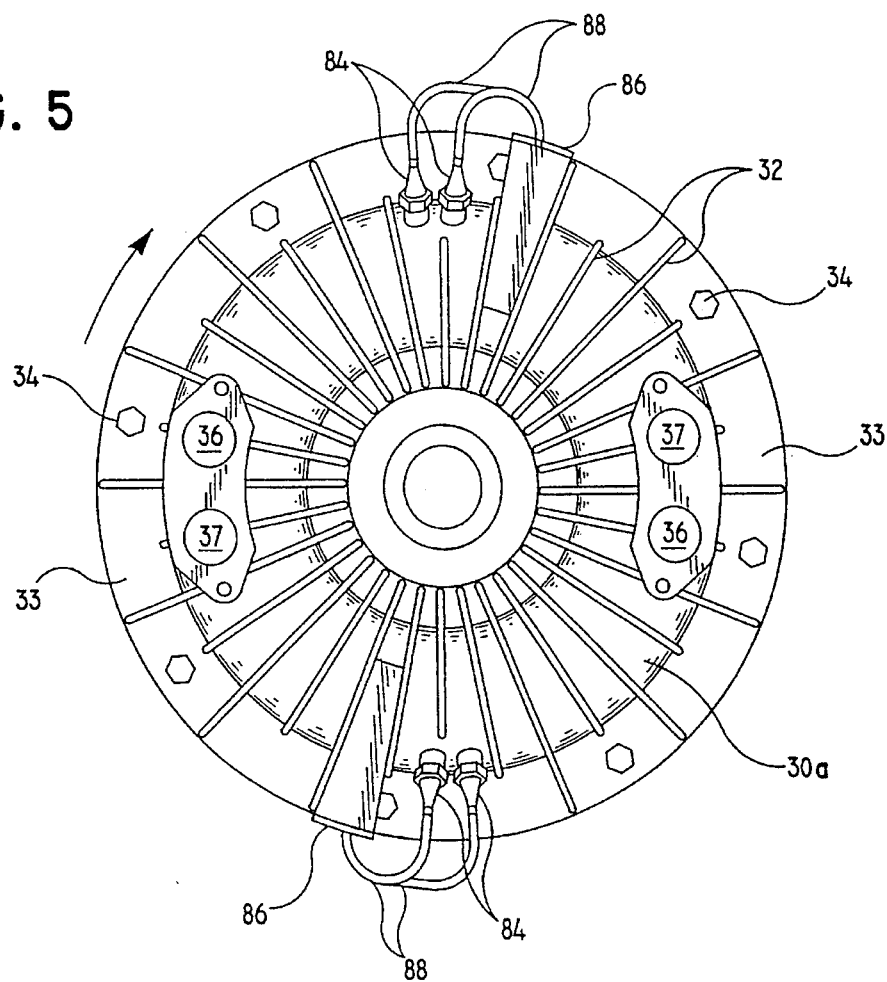
FIG. 5 is an elevational view of the engine, taken along line 5—5 of FIG. 1.

As shown in FIGS. 2, 5 and 10, the outer cylinder segment 30a is provided with a pair of diametrically-opposed intake ports 37, each of which communicates with the intake manifold. A pair of diametrically-opposed exhaust ports 36 are also provided in the outer cylinder segment 30a, offset from the intake ports 37 by about 22.5°. The exhaust from exhaust ports 36 communicates with an exhaust manifold (not shown) before exiting out the bottom of the helicopter.

In the preferred embodiment of the invention, the cylinder 14 (including the hub 25), the pistons 16, and the torque tubes 20, 24 are formed of 6061-T6-511 aluminum alloy.

Figure 4:
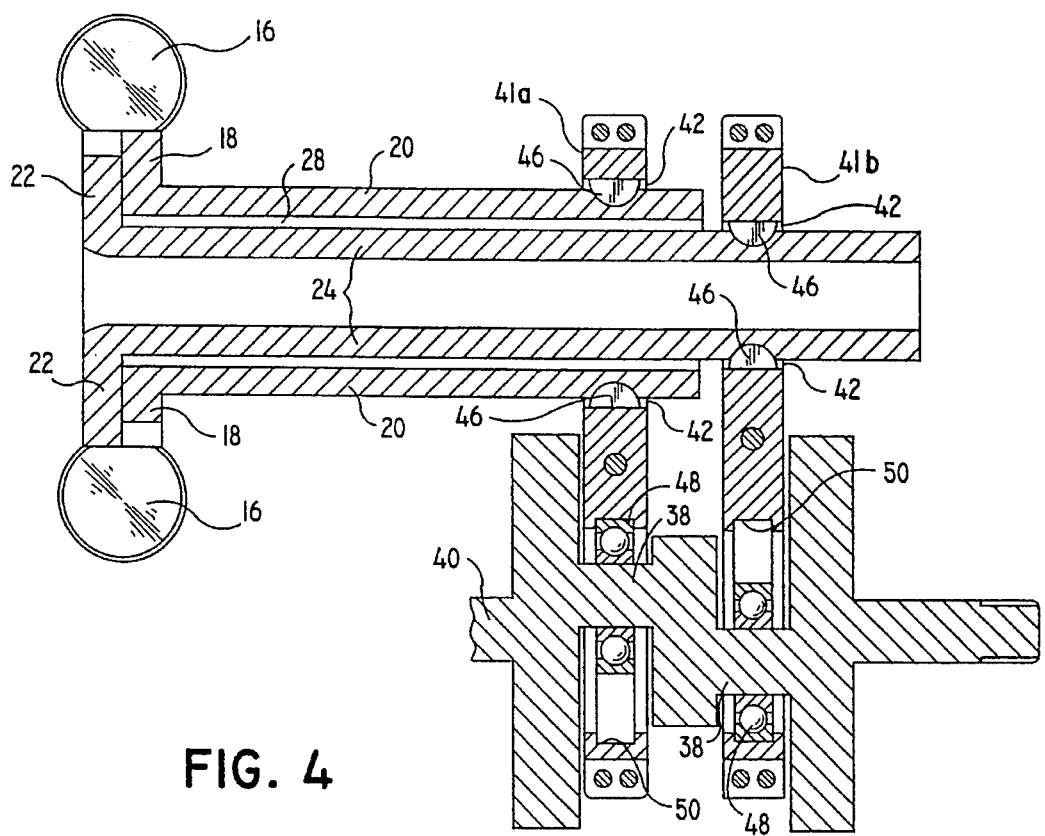
FIG. 4 is a longitudinal cross-sectional view of the engine, similar to that of FIG. 1, showing the pistons, torque tubes, Scotch yoke arms, and crankshaft in further detail.
Figure 3:
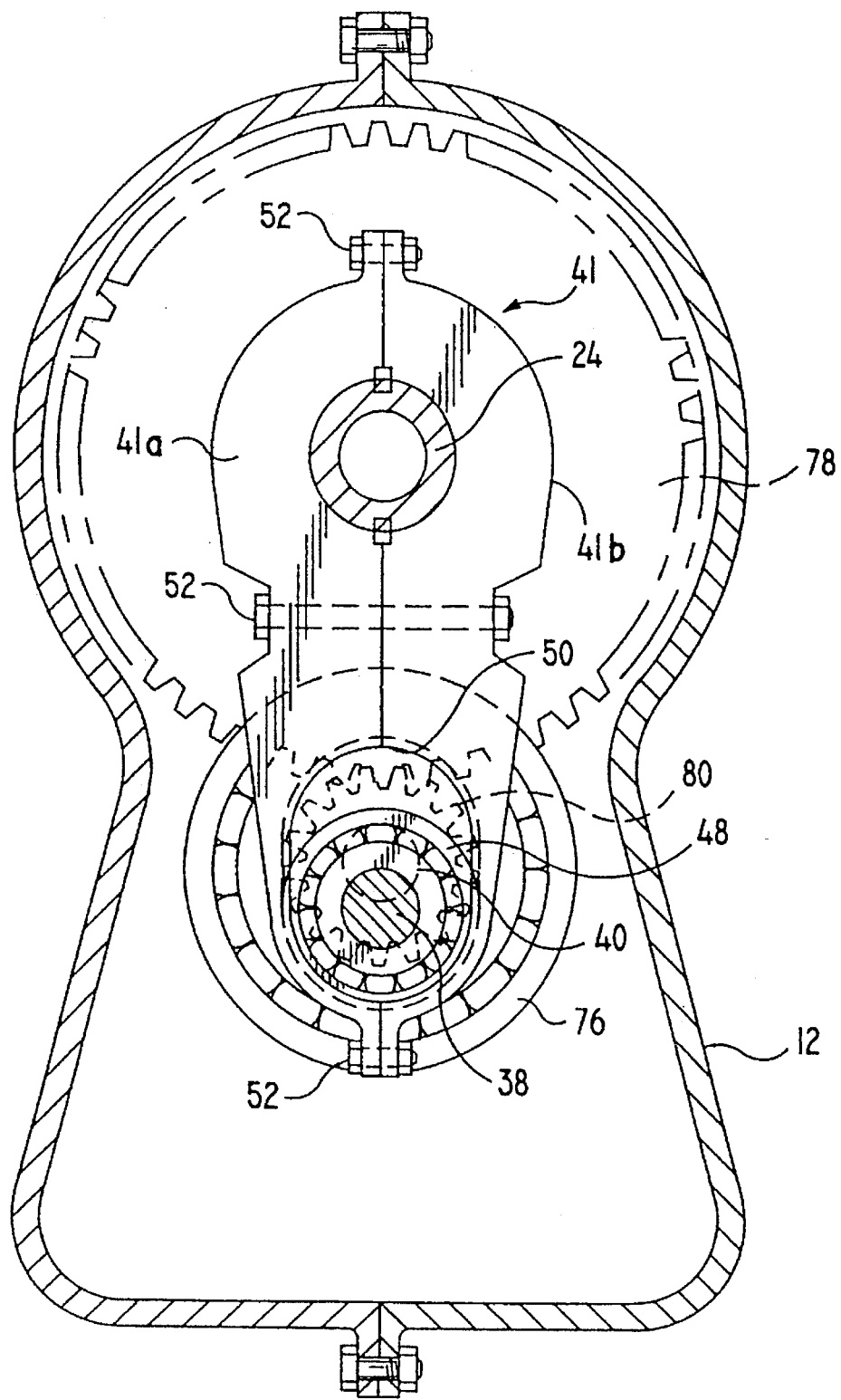
FIG. 3 is a cross-sectional view of the engine, taken along line 3—3 of FIG. 1.

Each of the torque tubes 20 and 24 is connected, by means of a so-called "Scotch yoke" mechanism, to a crank throw 38 on a crankshaft 40 rotatably journalled in the crankcase 12. As best shown in FIGS. 3 and 4, the Scotch yoke mechanism comprises a power arm 41 formed from two mating arm halves 41a and 41b, preferably made from the same aluminum alloy as the torque tubes. Each of the arm halves has a semicircular recess near its upper end (as oriented in FIG. 3), and a semi-elliptical recess near its lower end.

The semicircular recess has upper and lower slots 42, as best shown in FIG. 4. Each torque tube is provided with a groove that registers with the slots 42. The arm halves are assembled onto the torque tube with the arm slots 42 registering with the torque tube grooves, and a key member 46 is inserted between each of the slots and its registering groove to form a "Woodruff" key that firmly secures the arm onto the tube, with the tube thereby extending through the circular aperture formed by the registering semicircular recesses of the arm halves. The arm is thus rigidly fastened onto the tube, so that it rotates with the tube with neither axial nor circumferential slippage.

An annular ball bearing race 48 is installed on each of the crank throws 38. When the arm halves 41a and 41b of each arm are assembled onto their respective torque tubes, the semi-elliptical recesses in the arm halves form an elliptical aperture 50. During assembly, and before the arm halves are rigidly secured to each other and to the tube, the ball bearing race 48 is captured between the semi-elliptical recesses, so that it becomes seated in the elliptical aperture 50. The arm halves are then rigidly fixed to each other and to the tube by means such as bolts 52. The ball bearing race 48 is thus free to ride up and down (as oriented in FIG. 3) within the elliptical aperture with the movement of the crank throw 38.

Figure 6:
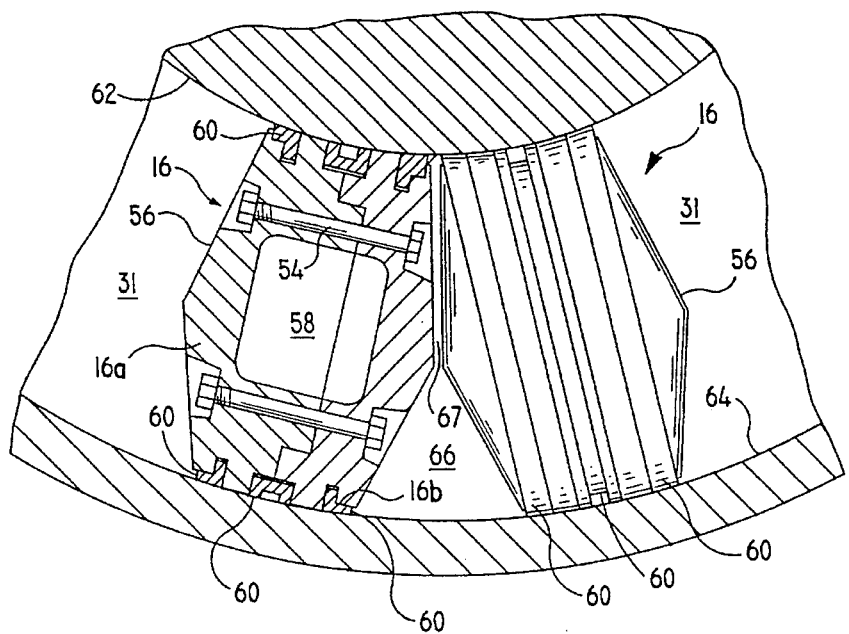
FIG. 6 is a detailed, partly cross-sectional view of a portion of the cylinder of the engine, showing a pair of mutually oscillating cylinders, one in cross-section, and one in elevation.

It will be appreciated that this Scotch yoke assembly provides a secure, positive mechanical linkage between the torque tubes 20 and 24 and the crankshaft 40, with fewer moving parts than the articulated, connecting rod linkage of the prior art. Thus, frictional losses are reduced, thereby increasing the efficiency of power transfer. Turning now to FIGS. 1, 4, and 6, the novel piston arrangement of the present invention is described. Each of the pistons 16 comprises a pair of mating, complementary piston segments 16a, 16b that, when secured to each other, as by roll pins 54, form a somewhat cylindrical piston body with oppositely-directed gabled faces 56. The piston segments are preferably formed so that, when assembled, they define a hollow interior cavity 58 to save weight and to reduce inertial stresses resulting from the oscillation of the pistons.

In actuality, as shown in FIG. 6, the body of each piston is not perfectly cylindrical; it has an axial radius of curvature that allows it to conform to the radius of curvature of the cylinder chamber 31. In addition, the piston body includes several circumferential grooves, into each of which is seated a cast iron compression ring 60 having a right-angle cross-section. The piston 16 thus seats against the inner wall 62 and outer wall 64 of the cylinder chamber 31, yet is free to oscillate within the chamber 31. The right-angle compression rings 60 are pressure-flexed against the walls of the cylinder chamber 31, so that their sealing effect is enhanced under compression.

The gabled piston faces 56 are configured so that, during the compression stroke, a substantially conical combustion chamber 66 is formed between each mutually-oscillating pair of pistons, the apex of the combustion chamber 66 being directed inwardly, toward the inner wall 62 of the cylinder chamber 31. This configuration of the combustion chamber 66 enhances the creation of an advantageous flame front progression throughout the volume of the combustion chamber upon ignition of the fuel, thereby providing a more efficient burn for improved fuel economy and reduced emissions, as compared with the flat-faced pistons of the prior art. Moreover, this configuration eliminates, or at least minimizes, the pressure spike associated with combustion in the flat-sided combustion chamber formed by flat-faced pistons, thereby substantially reducing inertial stress and vibration.

As shown in FIG. 6, at the end of the compression stroke a gap 67 exists between the two pistons, extending from the apex of the combustion chamber 66 to the inner wall 62 of the cylinder chamber 31. This gap 67 provides a "squish band" during combustion that produces an advantageous distribution of combustion pressure, thereby enhancing the engine's thermal efficiency (the extraction of mechanical energy from the combustion).

Furthermore, near the end of the power stroke, as each piston is propelled toward a piston in an adjacent mutually-oscillating piston pair, the approaching gabled piston faces create a compression damping that is progressive along each face, thereby further reducing the inertial stress on each piston at the limit of its travel, as compared with flat-sided pistons of the prior art. The crankshaft 40, preferably machined from a single piece of chrome molybdenum steel, is journalled within the crankcase 12 on an axis parallel with the axis of the tubes 20 and 24, and with the axis of rotation of cylinder 14. The crankshaft 40 is advantageously supported at both ends by suitable bearing means, such as roller bearings 68. A plurality of balancing discs, namely, a proximal balancing disc 70, a central balancing disc 72, and a distal balancing disc 74, are provided at spaced intervals along the length of the crankshaft 40. The balancing discs (preferably at least three, as shown) are advantageously formed as integral parts of the crankshaft 40. The central disc 72 is preferably slightly smaller in diameter than the outer discs 70, 74, and it is journalled within an annular ball bearing race 76 mounted within the crankcase. The discs 70, 72 and 74 provide for a smoothly continuous rotation of the crankshaft 40, with minimal vibration, and thus replace the single large flywheel of the prior art, while providing better balance for the shaft.

The cylinder 14 is driven by the crankshaft 40 in a 4:1 ratio through a gear train comprising a large annular spur gear 78 that meshes with a small annular spur gear 80. The large gear 78 concentrically surrounds the tubular cylinder hub 25 and the torque tubes 20, 24, and it is secured to the distal end of the hub 25 by means such as bolts 82. The small gear 80 is secured to the crankshaft 40 between the proximal balancing disc 70 and the proximal end of the shaft. Thus, the crankshaft 40 undergoes four revolutions for each revolution of the cylinder 14.

As previously mentioned, the present invention employs four mutually-oscillating pairs of pistons 16. One piston in each pair is fixed to the first annular flange 18 on the outer torque tube 20, and the other piston in each pair is fixed to the second flange 22 on the inner torque tube 24. The crank throws 38 on the crankshaft 40 are 180° apart, so that the Scotch yoke arms 41 oscillate their respective torque tubes 20 and 24 generally in opposite directions as the crankshaft rotates, thereby moving the pistons 16 in each mutually-oscillating pair in opposite directions, either toward or away from each other. The Scotch yoke arms 41 are at such an angle with respect to each other as to oscillate the pistons 16 on each tube 20 and 24 in accordance with the cycle of operation of the engine, as determined by the rotation of the cylinder 14, as will be described below. Since the crankshaft 40 undergoes four revolutions for each revolution of the cylinder 14, each mutually-oscillating pair of pistons 16 moves toward and away from each other eight times during each complete revolution of the cylinder 14. The stroke of movement of each piston 16 in either direction is therefore one-sixteenth of a revolution, or 22.5°. Accordingly, the Scotch yoke arms 41 are at a 22.5° included angle about the center of oscillation when the crank throws are in their extreme positions with respect to the arms 41, i.e., when the ball bearing races 48 are at their extremes of travel within the elliptical aperture 50 in the arms 41.

The preferred embodiment of the invention employs a spark plug ignition system, as illustrated in FIGS. 1 and 5. The spark ignition system preferably is a dual spark system, employing first and second pairs of spark plugs 84 at diametrically opposite positions within the cylinder 14. Each pair of spark plugs 84 is fired by a solid state ignition voltage generation device 86, mounted between two adjacent cooling fins 32 on the exterior of the cylinder 14, and connected to the spark plugs 84 by suitable ignition wires 88. The ignition voltage generation devices 86 are of a type that is triggered to generate an ignition voltage pulse in response to magnetic pulse. Such devices are commercially available from several sources, such as C. H. Electronics, of Riverton, Wyo., and GKD Products, of Garland, Tex. The devices 86 are modified for use in the present invention only by packaging their circuitry in a housing that can be installed between the cooling fins 32, as shown.

The magnetic means for generating the magnetic pulses comprise eight magnets 90, and a pair of Hall effect magnetic pickups 92. The magnets 90 are equidistantly spaced, at 45° intervals, around an annular magnet holder 94 that is fixed to the crankcase 12 so as to face the magnets 90 toward the cylinder 14. The pick-ups 92 are fixed to the inner cylinder segment 30b in diametrically opposite positions, facing the magnets 90, such that the rotation of the cylinder 14 brings the pick-ups 92 into close proximity to each of the magnets 90 in turn. Each of the pick-ups 92 is electrically connected to one of the ignition voltage generation devices 86.

Current from an electrical power source, such as a battery (not shown) or an alternator (not shown), is delivered to the ignition voltage generation devices 86 through a slip ring 96 mounted on the cylinder hub 25 to rotate therewith. Electrical contact between the slip ring 96 and the positive terminal of the power source is established through a plurality of brushes (not shown). A wire 98 electrically connects the slip ring 96 to each of the ignition voltage generation devices 86. The negative terminal of the power source, and the ground leads of the spark plugs 84, are connected to the crankcase.

As described above, each of the two ignition voltage generation devices 86 is triggered to fire its associated pair of spark plugs 84 each time its associated pick-up 92 passes by a magnet 90 during rotation of the cylinder. Thus, each of the two spark plug pairs fires eight times during a complete revolution of the cylinder, yielding a total of sixteen firings or power strokes for each revolution of the cylinder. The spark plug ignition system described above can be used with such fuels as gasoline, gasohol, alcohol, or propane, and is the preferred ignition system for high-power applications, i.e., over 100 horsepower.

Figure 7:
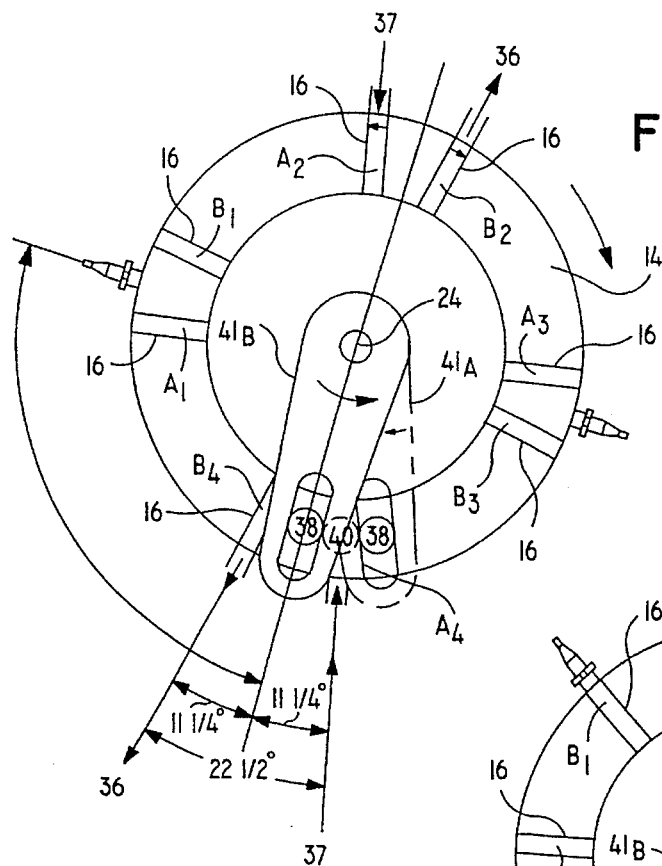
FIGS. 7, 8, and 9 are diagrammatic views illustrating the relative positions of the pistons, the intake and exhaust ports, and the ignition means during an operational cycle of the engine.
Figure 8:
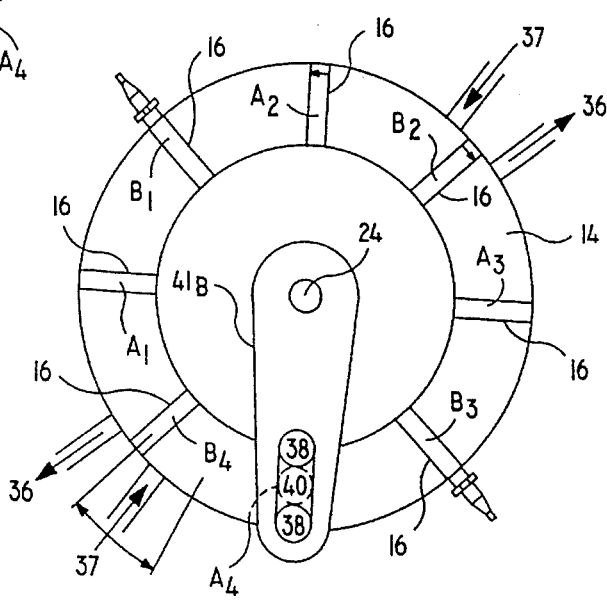
Figure 9:
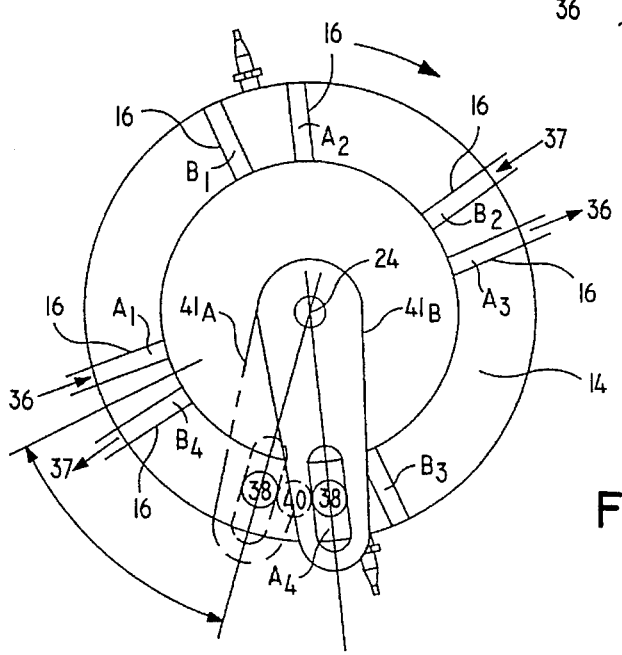

Referring now to FIGS. 7, 8 and 9, the order of firing and oscillation of pistons is illustrated. The pistons 16 connected to the power arm (scotch yoke) 41b on the inner torque tube 24 are marked in these figures in sequence, $A_1$, $A_2$, $A_3$, and $A_4$, and the pistons 16 connected to the outer torque tube 20 and operated by the power arm (scotch yoke) 41a are in corresponding sequence indicated $B_4$, $B_1$, $B_2$, $B_3$, $B_4$.

FIG. 7 corresponds to the position of the crankshaft 40 and the power arms (scotch yokes) 41a and 41b shown in FIG. 4. In this position, the pairs of pistons $A_1$ and $B_1$ and $A_3$ and $B_2$ completed the compression stroke and are in position for firing $B_4$ the ignition means, spark plugs or by the alternative glow plugs. The other pairs of pistons $A_2$ and $B_2$, and $A_4$ and $B_4$, just completed their respective exhaust strokes and expelled the products of combustion from the space between them. The spaces between $A_1$ and $B_4$, and $A_3$ and $B_2$, are respectively expanded as the power strokes are about completed and these spaces are now ready for the exhaust stroke to begin. The spaces between $B_1$ and $A_2$, and $B_3$ and $A_4$, have been fully expanded as the intake strokes have been just completed and these spaces are ready for their respective compression strokes. The annular cylinder (power head) 14 rotates in a clockwise direction and in the opposite direction to the rotation of the crankshaft 40. The adjacent exhaust and intake ports 36 and 37 are paired respectively in diametrically opposite sides of the power head 14 and in each pair the intake port 37 and the exhaust port 36 and 22½° apart to correspond to the 4 to 1 ratio of rotation between the power head (anneal cylinder) 14 and the crankshaft 40, and to the corresponding stroke of oscillation of the pistons 16. As the crankshaft 40 rotates 90° from the position shown in FIG. 7, to the position shown in FIG. 8. The power arm 41b is oscillated in a counter-clockwise direction and the power arm 41a in a clockwise direction. Each power arm is oscillated about 11¼° so that they are substantially superimposed one above the other. Correspondingly, the pistons 16, $A_1$, $A_2$, $A_3$ and $A_4$ are moved one half of their strokes in a counter-clockwise direction shown in FIG. 7 and the pistons 16, $B_1$, $B_2$, $B_3$, and $B_4$ are moved in a clockwise direction as shown in FIG. 7. This corresponds to the power stroke while pistons 16, $A_1$ and $B_1$ are moved apart as well as the power stroke between pistons 16, $A_3$ arid $B_3$ moving apart. At the same time $B_1$ and $A_2$ are moving together to compress the fuel-air mixture there between as well as between $B_3$ and $A_4$.

The spaces between the pistons 16, $A_2$ and $B_2$ as well as between the pistons 16, $A_4$ and $B_4$ moving apart are aligned with the opposite respective intake ports 37 and continue the intake of the fuel-air mixture. The pistons 16, $A_1$ and $B_4$ and the opposite pistons 16, $A_3$ and $B_2$ continue to move together for the exhaust stroke between them as aligned with the respective exhaust ports 36 of the annular cylinder or power head 14.

Further rotation of the crankshaft 40 another 90° from the position shown in FIG. 8 to the position shown in FIG. 9 another 90° namely a total of 180° from the position shown in FIG. 7 oscillates the power arm (scotch yoke) 41a in a counter-clockwise direction into the previous position of power arm (scotch yoke) 41b and oscillates the power arm 41b in a clockwise direction into the initial position of the power arm 41a, shown in FIG. 8, there by completing the expansion of the power stroke between the pair of pistons 16, $A_1$ and $B_1$ and $A_3$ and $B_3$ as well as completing the exhaust stroke between pistons 16, $A_1$ and $B_4$, and $A_3$ and $B_2$, and the compression stroke respectively between piston 16, $B_1$ and $A_2$, and $B_3$ and $A_4$. As compared between FIG. 7 and FIG. 9 during the full stroke of the pistons 16, in one direction of the ¼ and are of the circle of the power head 14, also moves 45° or one eighth of a revolution and thereby advances the spark plug or ignition means to the position between pistons 16, $B_1$ and $A_2$ on one side and $B_3$ and $A_4$ on the other side for the next firing.

It is to be noted that the exhaust 36 and the intake 37 ports or openings are equally spaced angularly from a diameter of the power head 14 (annular cylinder) at right angles to the diameter which extends through the opposite ignition means or spark plugs. Therefore, the exhaust port is advanced so as to approach the space between $A_1$ and $B_1$ for the next consecutive exhaust stroke. The other diametrically opposite ports are correspondingly shifted.

By continued rotation of the crankshaft 40 over the other half of revolution the previously described cycle of operation is repeated in sequence between the consecutive pairs of pistons 16.

The power generated by the power stroke is transmitted through the torque discs 22 and 18 and the respective torque tubes 24 and 20 and to the power arms (scotch yokes) 41a and 41b to the crankshaft 40 to cause the rotation of the crankshaft 40. In turn, the rotation of the crankshaft 40 transmitting power through gear 80 and gear 78 in the usual manner rotates the power head (annular cylinder) 14 in a clockwise direction and by reason of the oscillation of the torque tubes 24 and 20 and the strokes of the respective pistons 16 are correspondingly shifted into the successive positions for operation in the firing order heretofore described.

FIG. 10 illustrates a preferred embodiment of the present invention in which the improved oscillating piston engine 10 provides the motive power to drive the main rotor head and blades 100 of the helicopter and the tail rotor (not shown) for torque control. In addition, it can drive in a vertical power train.

Engine 10 is shown mounted within shroud 107 having an air inlet 108. Engine 10 output shaft 40 rotational speed is reduced through primary transmission 110. Such transmissions include a clutch equipped Sunstrand Planetary Reduction system manufactured by the Sunstrand Corporation and available commercially or the Infinitely Variable Transmission (IVT) developed by Epilogics Inc., Los Gatos, Calif. The latter is the preferred transmission system.

Infinitely Variable Transmission (IVT) 110 is a beltless, clutchless transmission capable of handling the recommended constant high RPM output shaft 40 speed produced by piston engine 10. Helicopters operate in a constant main rotor blade rotational speed regime where engine 10 and transmission 110 speed are selected by the pilot operator and the main and tail rotor blades pitch angles are varied in a collective and cyclic manner to cause flight in a three axis envelope.

In the case of the single engine 10 vertically configured power train as shown in FIG. 10, an engine rated 500 hp or more is operated at a constant 4000 rpm cylinder speed, producing 16000 rpm output shaft 40 speed which drives IVT 110 to produce the proper speed of rotor head control unit 113 and input shaft 114 to accomplish flight. The vertically originated power train units are housed within shroud 107 and suspended fixedly on shock isolation mounts 115. Such mounts are manufactured and commercially available from Lord Manufacturing, P.O. Box 10039, Erie, Pa. 16514 or Barry Controls, P.O. Box 7710, Burbank, Calif. 91505. Mounts 115 are fixedly attached to the inner wall of shroud 107 as shown FIG. 10. Shroud 107 is a structural part of the helicopter and causes air to be conducted from the inlet scoop 108, equipped with an anti-bird screen (not shown), down shroud 107 cooling the units therein and exiting out outlet 116 at the bottom of the helicopter, along with the combustion exhaust products from engine 10. Cooling fins 32 on cylinder 14 of engine 10 are angularly canted to act as an air pumping fan during operation to further improved air flow through shroud 107. The improved oscillating piston engine 10 is designed to operate on various fuels including gasoline, alcohol, gasohol, and propane. In the case of an airworthy vehicle such as a helicopter, engine 10 operates on aviation grade gasoline with fuel induction controlled by fuel injection and ignition module 117. Such modules are available as those manufactured by the Bob Smith Company, Oceano, Calif.

FIG. 11 illustrates another embodiment of the present invention in which a horizontally mounted power train is located along each side of the main rotor blade control transmission above a helicopter cabin and replaces the conventional twin turbine engine power systems.

Two improved oscillating piston engines 10 are located on each side of main rotor blade 120 and control transmission 121 as viewed from above. Each engine 10 drives an Infinitely Variable Transmission (IVT) 123 through shaft 40 which in turn drives the main rotor blade control transmission 121 by means of shaft 126 from the torque conversion unit 128 to main rotor blade control transmission 121. Each engine 10 power train system units are suspended fixedly in shroud 130 on shock isolated mounts 132. Ram air flows through shroud 130 in the direction shown in FIG. 11. The speed of output shaft 30 and the resulting torque power are controlled by the fuel injection and ignition module 116. These dual fuel injection and ignition modules 116 are synchronized and balanced for equal power output performance. Engine cylinder cooling fins 32 are angle canted to produce air pumping fan action during operation. The air flow through shroud 130 exits through exhaust nozzle 133 along with the engine 10 exhaust products.

What is claimed is:

1. An internal combustion engine system to provide the motive power source of a rotor system comprising:

(a) a rotating annular cylinder, (b) a plurality of pairs of oscillating pistons in said cylinder, (c) means to oscillate said pistons so as to alternately move adjacent pistons apart from one another and toward one another for the respective strokes an the internal combustion engine of said system, (d) intake ports, exhaust ports and ignition means on said rotating annular cylinder for registry with the respective spaces between the adjacent pistons according to the firing order and cycle of said engine, (e) a power take-off shaft in said engine, (f) means to convert the oscillating of said pistons into rotation of said power take-off shaft, (g) transmitting means between said power take-off shaft and said cylinder to rotate said annular cylinder in a predetermined ratio to the oscillation of said piston for registering said intake ports, exhaust ports and ignition means with the respective spaces between said oscillating pistons in a predetermined sequence, (h) the ratio between the rotation of said shaft and the resulting angular oscillation of said pistons with respect to the rotating annular cylinder is one oscillation of each piston for each quarter of one revolution of said cylinder, (i) the inner periphery of the cylinder being of circular cross-section and said pistons being also of circular cross-section, and piston rings on said pistons being in contact with the inner circular periphery of said cylinder, (j) said means to convert said piston oscillation into rotation including concentric tubes journalled concentrically with said rotating cylinder, (k) connecting means between the tubes and the power take-off shaft for converting oscillation of the tubes into rotation of the shaft, (l) a crankcase, (m) journal means on said crankcase to support said rotating cylinder in a generally horizontal plane, (n) said oscillation converting means including connecting devices between the respective concentric tubes and said power take-off shaft for oscillating said tubes oppositely to one another during the rotation of said shaft, (o) said inner tube being connected to a fuel vapor intake, (p) an intake manifold on said rotating cylinder connected to the said intake ports, said inner tube discharging into said intake manifold, (q) piston supporting torque disks being flanges extending from the respective concentric tube to the inner periphery of said rotating cylinder and to the adjacent pistons so that said pistons are directly connected alternately to each of the respective torque disks, (r) transmission means for reducing the torque speed of said power take-off shaft, and for providing the motive force for rotating a rotor system, operably connected to said power take-off shaft, (s) said torque disks being slidable relatively to one another according to relative turning movement of said concentric tubes and extending from the respective tubes to support said pistons in a balanced position in said cylinder, (t) each of said pistons having a substantially cylindrical section which is operably seated against the walls of said cylinder and which is attached to each of the respective torque disks, and (u) each of said connecting means between each of the concentric tubes and the power take-off shaft comprises an elongated arm having a circular aperture near one end thereof and through which one of the respective tubes passes and is fixedly attached thereto and having an elliptical aperture near the other end thereof operably connected to said power take-off shaft to transmit the axial oscillation of each of said torque discs and the back-and-forth oscillation into rotation of the power take-off shaft.

2. The internal combustion engine system defined in claim 1 wherein said transmission means comprises:

(v) a variable transmission.

3. The internal combustion engine system defined in claim 1 wherein said engine system is housed within:

(w) a cooling and exhaust shroud having an inlet and an outlet.

4. The internal combustion engine system defined in claim 1 wherein:

(x) each of said pistons being made of two complemental substantially cylindrical sections having a pair of oppositely-directed gabled faces, (y) said gabled faces being configured to form a substantially conical combustion chamber at the end of the compression stroke, and (z) means to align and secure said substantially cylindrical sections together.

5. The internal combustion engine system defined in claim 3 wherein:

(aa) cooling fins are operably mounted onto said rotating annular cylinder to provide fan pumping action to draw air into the rotor system and down through the inlet of said shroud to cool said engine and to exhaust combusted fuel gases from said exhaust port to the outlet of said shroud.

6. An internal combustion engine system to provide the motive power source of main and tail rotor systems comprising:

(a) a crankcase, (b) an annular cylinder, (c) a hub of said annular cylinder rotatably journalled on said crankcase, (d) an inner tube and an outer tube concentrically journalled in said crankcase and in said hub, (e) a plurality of circumferentially equally spaced pistons seated within said annular cylinder, (f) a crankshaft journalled in said crankcase, (g) connecting means between said crankshaft and said tubes for oscillating said tubes angularly about the axis of said cylinder and oppositely to one another for the respective strokes of said pistons by the rotation of the crankshaft and to transmit power from said tubes to said crankshaft, (h) circumferentially spaced intake ports, outlet ports and ignition means on said cylinder, (i) means to transmit rotation from said crankshaft to said cylinder so as to register said ports and said ignition means with the respective spaces between said pistons in a predetermined sequence relative to the respective strokes of said pistons, (j) the axis of rotation of said cylinder and of said crankshaft being parallel, (k) an intake manifold on said cylinder connected to said intake ports, (l) said inner tube extending to said intake manifold at one end thereof and through said crankcase at its other end and being connectable at said other end to a combustible fuel supply, (m) a plurality of torque discs connecting the hub to the cylinder, (n) variable transmission means for reducing the torque speed of said crankshaft and for providing force for rotating main rotor head and blades and tail rotor systems, operably connected to said crankshaft, (o) said connecting means comprises an elongated yoke arm having a circular aperture near one end thereof and through which one of the respective tubes passes and is fixedly attached thereto and having an elliptical aperture near the other end thereof operably connected to said crankshaft to transmit the axial oscillation of each of said torque discs and the back-and-forth oscillation into rotation of the crankshaft.

7. The internal combustion engine system defined in claim 6 wherein:

(p) each of said pistons being made of two complemental substantially cylindrical sections having a pair of oppositely-directed gabled faces, said substantially cylindrical sections which are operably seated against the walls of said cylinder and one section of which is fixedly attached to each of the respective torque discs, said pistons being circumferentially spaced from one another, said gabled faces being configured to form a substantially conical combustion chamber at the end of the compression stroke.

8. The internal combustion engine system defined in claim 6 wherein said engine is housed within:

(q) a cooling and exhaust shroud having an inlet and outlet.

9. The internal combustion engine system defined in claim 8 wherein:

(r) cooling fins are operably mounted onto said annular cylinder to provide fan pumping action to draw air into the main rotor system and down through the inlet of said shroud to cool said engine and to exhaust combusted fuel gases from said exhaust port to the outlet of said shroud.

10. The internal combustion engine system defined in claim 6 wherein:

(s) the adjacent surfaces of said torque discs are in sliding contact therebetween, said surfaces having annular grooves therein, and (t) annular packing elements positioned in said grooves.

11. The internal combustion engine system defined in claim 6 wherein:

(u) said ignition means comprises a plurality of spark plugs, voltage generation means, and ignition wires connected between said spark plugs and said ignition wires.

12. The internal combustion engine system defined in claim 11 wherein:

(v) said voltage generation means comprises magnetic means to generate magnetic pulses for generating ignition voltage.

13. The internal combustion engine system defined in claim 6 wherein four pairs of said pistons are provided in diametrically opposite symmetrical arrangement, and wherein the ratio of rotation of the cylinder to the oscillation of the pistons is one revolution of the cylinder for eight strokes of oscillation of each piston.

14. The internal combustion engine system defined in claim 6 wherein:

(w) said cylinder is formed of a pair of super-imposed complemental rings of semi-cylindrical cross-section, (x) a hub section on each ring forming said hub means, and (y) said torque discs and said tubes being spaced so as to accommodate said oscillating piston therebetween.

15. The internal combustion engine system as defined in claim 14 wherein:

(z) each stroke of oscillation of each piston coinciding to about one-sixteenth of a revolution of cylinder, (aa) an inlet port and an exhaust port located in a pair spaced circumferentially on the cylinder about twenty-two and a half degrees apart, and diametrically opposite to one another paired inlet ports and exhaust ports, and (bb) said ignition means being at diametrically opposite areas of said cylinder and circumferentially at about right angles from the respective pairs of inlet and exhaust ports.

16. The internal combustion engine system as defined in claim 6 wherein:

(cc) polytetrafluoroethylene is positioned between said inner tube and said outer tube.

17. The internal combustion engine system as defined in claim 6 wherein:

(dd) a plurality of balance wheels are positioned on said crankshaft.

18. An internal combustion engine system housed within a shroud to provide the motive power source of a rotor system comprising:

(a) a rotating annular cylinder, (b) a plurality of pairs of oscillating pistons in said cylinder, (c) means to oscillate said pistons so as to alternately move adjacent pistons apart from one another and toward one another for the respective strokes of an internal combustion engine of said system, (d) intake ports, exhaust ports and ignition means on said rotating annular cylinder for registry with the respective spaces between the adjacent pistons according to the firing order and cycle of said engine, (e) a power take-off shaft in said engine, (f) means to convert the oscillating of said pistons into rotation of said power take-off shaft, (g) transmitting means between said power take-off shaft and said cylinder to rotate said annular cylinder in a predetermined ratio to the oscillation of said piston for registering said intake ports, exhaust ports and ignition means with the respective spaces between said oscillating pistons in a predetermined sequence, (h) a crankcase, (i) journal means on said crankcase to support said rotating cylinder in a generally horizontal plane, (j) an intake manifold on said rotating cylinder connected to the said intake ports and a fuel vapor intake, (k) transmission means for reducing the torque speed of said power take-off shaft and for providing the motive force, and for rotating a rotor system, operably connected to said power take-off shaft, (l) a cooling and exhaust shroud having an inlet and an outlet in which said engine system is housed, and (m) cooling fins operably mounted onto said rotating annular cylinder to provide fan pumping action to draw air into the inlet of said cooling and exhaust shroud and down through said shroud to cool said engine and to exhaust combusted fuel gases from said exhaust port to the outlet of said shroud.

19. The internal combustion engine system defined in claim 18 wherein said transmission system comprises:

(n) a variable transmission.

20. The internal combustion engine system defined in claim 18 wherein:

(o) one of said internal combustion engine systems is located on each side of the rotor system, and (p) transmission means are operably connected to said power take-off shaft of each of said engines.

* * * * *